July 11, 1950 M. RABINOWICZ 2,514,670

WIRELESS RECEIVING APPARATUS

Filed Feb. 13, 1948 2 Sheets-Sheet 1

Inventor
M. Rabinowicz
By Glascock Downing Seebold
Attys.

July 11, 1950 M. RABINOWICZ 2,514,670

WIRELESS RECEIVING APPARATUS

Filed Feb. 13, 1948 2 Sheets-Sheet 2

Inventor
M. Rabinowicz
By Glascock Downing Seebold
Attys.

Patented July 11, 1950 2,514,670

UNITED STATES PATENT OFFICE 2,514,670

WIRELESS RECEIVING APPARATUS

Mechal Rabinowicz, London, England

Application February 13, 1948, Serial No. 8,096
In Great Britain February 25, 1947

5 Claims. (Cl. 250—14)

This invention relates to wireless receiving apparatus, and more particularly to broadcast receivers, of the kind having a casing member which is rotatable around a supporting column and is operatively connected to the tuning control means of the receiver, so as to enable the receiver to be tuned to the required wavelength by rotating the said casing member.

In wireless receiving apparatus of the kind referred to, it has been proposed to mount the tuning condensers on a platform to which the supporting column is fixed, the spindles of the condensers being connected by gearing to the rotatable casing member.

According to the present invention, the receiving apparatus, including one or more tuning control members, is mounted on a platform which is rotatable with respect to the supporting column, the said platform and the receiving apparatus thereon being enclosed by a casing, at least a part of which is rigidly connected to the platform so as to be rotatable therewith, actuating means for operating the tuning control members being provided between the latter and the stationary column, so that tuning of the receiver is effected by the bodily rotation of the tuning control means around the column when the casing or rotatable casing part is turned.

This arrangement has the advantage that the supporting platform acts as internal bracing means for the casing, and is of particular importance in the case of a spherical or other casing which completely encloses the platform, since the latter may be provided with a bearing sleeve through which the column passes, thereby forming an internal bearing support for the casing.

The tuning control members may comprise one or more variable condensers or a plurality of pretuned circuits similar to the well-known press-button arrangements.

The supporting platform may be circular, square or polygonal and flanged or otherwise. In the case of a square or polygonal platform, the casing is preferably attached thereto at the corners.

Figures 1, 5, 6:
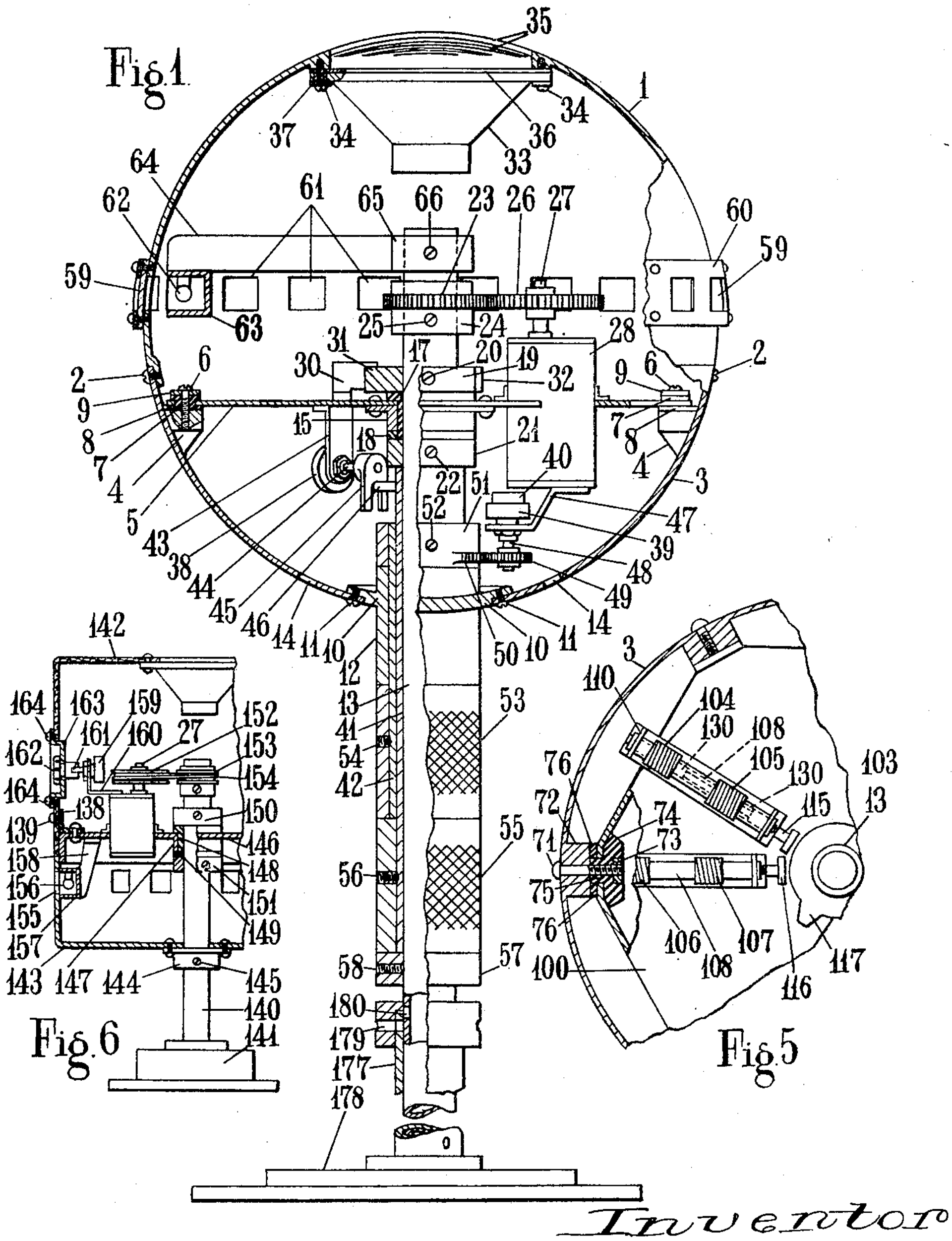
Figures 2, 3, 4, 7:
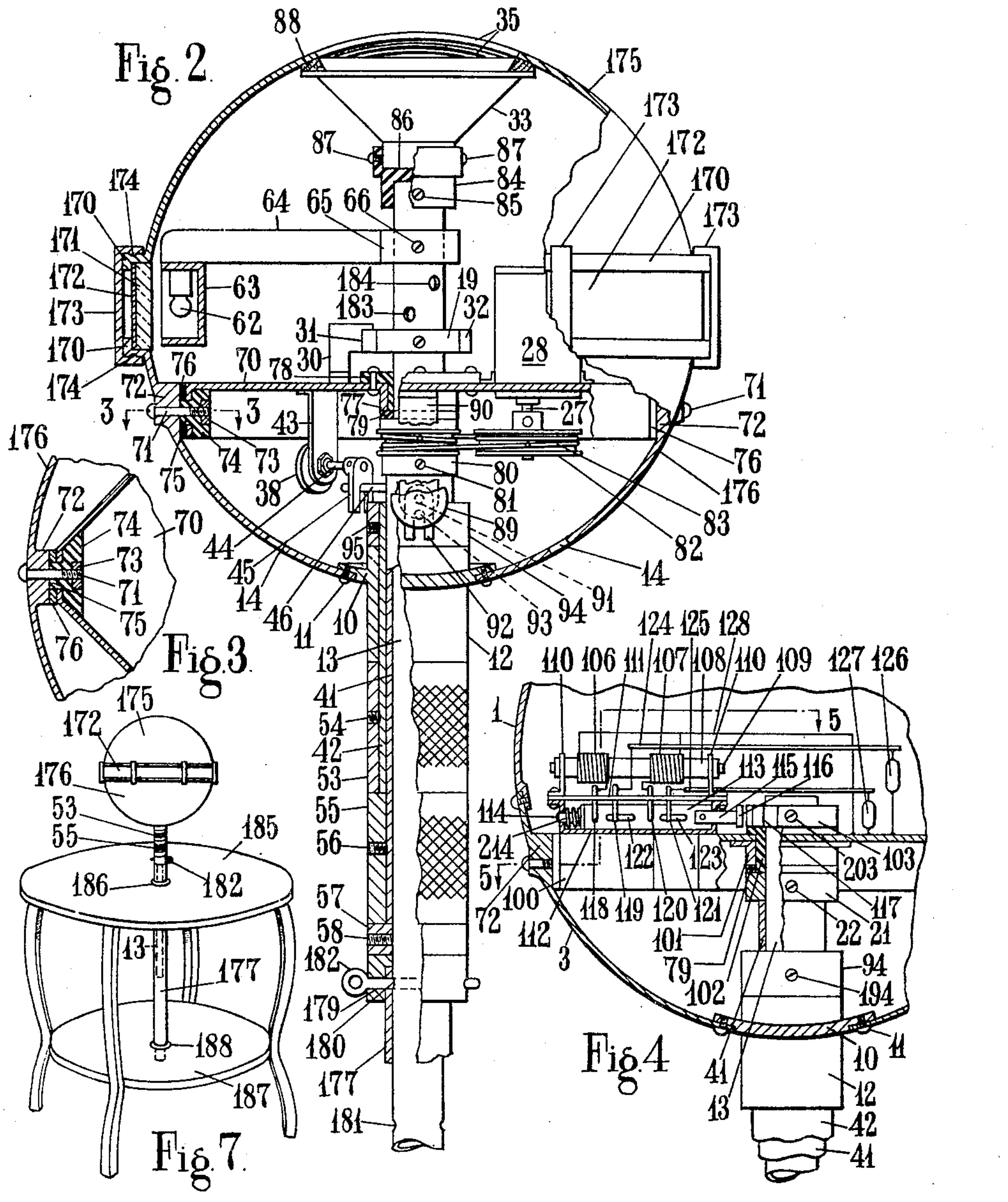

The invention is illustrated by way of example in the accompanying drawings, in which:

Figure 1 is a vertical central section, partly in side elevation of a receiver having a non-flanged circular supporting platform, Figure 2 is a vertical central section, partly in side elevation of a receiver having a flanged square supporting platform, Figure 3 is a detail horizontal section on the line 3—3 of Figure 2, Figure 4 is a part vertical central section of a receiver in which the tuning means comprise a plurality of pretuned circuits, Figure 5 is a horizontal section through the casing of the receiver shown in Figure 4 on the line 5—5, the supporting platform being shown in plan but partly broken away to show the manner in which it is attached to the casing, Figure 6 is a part vertical central section through a receiver having a cylindrical casing only the upper part of which is rotatable, Figure 7 is a perspective view of a receiver combined with a table.

Referring to Figure 1 of the accompanying drawings, the receiver has a spherical casing comprising an upper part 1 connected by means of screws 2 to a lower part 3 provided with internal lugs 4 to which a circular platform 5 is removably attached by means of screws 6. In this embodiment, the casing is made of metal and is insulated from the platform 6 by means of an insulating plate 8, which is interposed between the platform 5 and each of the lugs 4, and a flanged collar 7 of insulating material which surrounds the screw 6 and against which the head of the screw bears through the intermediary of a washer 9.

The bottom of the lower casing part 3 is provided with an opening which is closed by a cover plate 10 which is removably attached to the casing part 3 by means of screws 11, the said cover plate having a hub 12 which surrounds a supporting column 13 around which the casing 2, 3 is rotatable. The bottom of the casing part 3 is also provided with ventilation openings 14.

The platform 5 has a bearing hub 15 secured thereto in which is inserted a liner sleeve 17 of insulating material through which the column 13 passes, the lower end of said sleeve being encircled by a washer 18, the upper end of the sleeve 17 having an integral flange against which bears a collar 19 which is secured to the column 13 by means of a screw 20. A collar 21 secured to the column 13 by means of a screw 22 bears against the washer 18 which insulates the said collar from the end of the hub 15.

A gear wheel 23, the hub 24 of which is fixed to the column 13 by means of a screw 25 meshes with a gear wheel 26 fixed on the spindle 27 of a variable tuning condenser 28 mounted on the platform 5, the arrangement described being such that when the casing 2, 3 is turned around the column 13, the platform 5 turns with it and the condenser 28 revolves bodily around the column. During the rotation of the platform 5, the gear wheel 26 rolls around the gear wheel 23 and the spindle 27 of the condenser 28 is turned. A stop 30 fixed on the platform 5 co-operates with stop members comprising lugs 31 and 32 integral with the collar 19, the said stop members being spaced a suitable angular distance apart from one another so as to limit the rotary movement of the casing in either direction.

The top of the casing part 1 is provided with slots 35 behind which a loud speaker movement 33 is attached to the inside of the casing by screws 34. In the case of an energised loud speaker, a liner 36 of insulating material is interposed between the unit 33 and the casing part 1, the screws being provided with insulating bushes 37, so as to avoid the risk of shock to the user of the receiver.

As the platform 5 is insulated from the casing part 2 and the insulating sleeve 17 and washer 18 insulate the platform from the column 13, the risk of shock to the user owing to leakage from the platform 5 to the casing or the supporting column is avoided. The sleeve 17 and washer 18 may be made of phenolic resin or any other suitable insulating material.

In order to avoid the necessity of providing actuating knobs on the casing for the subsidiary control members, such as a wave-change switch or a volume control device, in the embodiment of the invention shown in Figure 1, the wave-change switch 38 and the combined on-and-off switch 40 and volume control potentiometer 39 are operated by tubular adjusting members 41, 42, respectively which extend along the outside of the column 13 into the receiver casing. The members 41, 42 are arranged concentrically between the column 13 and the hub 12 of the cover plate 10, the member 41 which actuates the wave-change switch 38 being arranged next the column. The wave-change switch 38 is carried by a bracket 43 fixed to the underside of the platform 5 and its spindle 44 has a forked lever 45 fixed thereon which straddles a pin 46 extending radially from the tubular member 41. The potentiometer and switch unit 39, 40 is carried by a bracket 47 fixed to the lower end of the casing of the condenser 28 and its spindle 48 has a gear wheel 49 fixed thereon which meshes with a toothed segment 50 integral with a collar 51 fixed to the upper end of the member 42 by means of a screw 52.

The lower end of the member 42 projects below the hub 12, a knurled actuating sleeve 53 being fixed to the projecting portion by a screw 54, while the lower end of the member 41 projects below the lower end of the member 42 and the projecting portion thereof has a knurled actuating sleeve 55 secured thereto by means of a screw 56. A collar 57 fixed on the column 13 by means of a screw 58 serves as a bottom bearing support for the member 41 and the sleeve 55.

When the casing 1, 3 is turned to adjust the tuning of the receiver, the locking means for maintaining the spindle of the wave-change switch 38 in its respective adjusted positions serve for preventing relative rotation between the member 41 and the platform 5. When the sleeve 55, however, is turned with sufficient force the pin 46 rocks the lever 45 and thereby adjusts the spindle of the switch 38. Similarly, by turning the sleeve 53, the potentiometer can be adjusted as required, or its spindle may be turned sufficiently to switch off the receiver entirely.

The casing of the receiver is provided with station identification means, comprising a translucent dial strip 59 extending circumferentially around the casing part 1, the said dial strip being removably secured to the casing part 1 by means of a cover strip 60. Behind the dial strip 59, the casing part 1 is provided with windows 61 which are illuminated by a dial lamp 62 inside the casing. The dial lamp 62 is mounted inside a housing 63 fixed on the underside of an arm 64 having an eye 65 through which the upper end of the column 13 is passed, the said arm being secured to the column by means of a screw 66 passing through the eye 65. The housing 63 serves to prevent the dial lamp from shining through more than one window 61 at a time.

The column 13 is slidable within a tubular pillar 177 which is integral with and extends upwardly from a pedestal base 178, so as to enable the receiver to be supported upon the floor of a room. The upper end of the pillar 177 is provided with a pair of diametrically opposed holes 179 which are adapted to register with a pair of diametrically opposed holes 180 in the column 13. The holes 179, 180 are adapted to receive a pin (not shown) which prevents rotation of the column with respect to the pillar 177 and pedestal 178. More than one pair of diametrically opposed holes 180 may be provided in the column 13 at different points in the length thereof, so as to enable the receiver casing to be supported at different heights from the floor.

In the embodiment shown in Figures 2 and 3, the supporting platform comprises a square flanged chassis member 70 which is removably attached to the casing part 176 at the corners by means of screws 71 passing through lugs 72 integral with the said casing part. The screws 71 are screwed into nuts 73 embedded in blocks of insulating material 74 provided inside the member 70 at the corners thereof, the said blocks having hollow cylindrical extensions 75 passing through holes in the corners of the member 70 and surrounding the screws 71. The lugs 72 on the casing part 3 are insulated from the corners of the member 70 by means of plates 76 of insulating material.

The member 70 has a downwardly extending boss 77 provided with a liner sleeve 78 of insulating material through which the supporting column 13 passes. A washer 79 of insulating material encircles the column 13 below the boss 77 and sleeve 78, against which bears the upper end of a flanged pulley 80 which is fixed to the column 13 by means of a screw 81.

The spindle 27 of the tuning condenser 28 extends downwardly below the member 70 and is driven by means of a flanged pulley 82 fixed to the spindle and a driving cord 83 which is passed around the said pulley and the pulley 80 fixed to the column 13, so that when the casing 175, 176 is turned, the pulley 82 revolves around the column 13 and the cord 83 is wound off one pulley and wound on the other, thereby turning the spindle 27.

The loud speaker movement 33 is carried by the upper end of the column 13 which is provided with a socket member 84 of insulating material secured thereto by means of a screw 85. The member 84 has an internal partition wall 86 which rests on the end of the column 13 and on which the loud speaker movement 33 bears, the said movement being secured to the socket 84 by means of screws 87. A ring 88 of felt is interposed between the cone frame of the speaker movement and the upper part of the casing provided with slots 35.

The casing parts 175, 176 are each provided at their edges with a flange 170 having a rim which fits over a cylindrical member 171 of transparent or translucent plastic material, e. g. of an acrylic ester type, on the outside of which is provided a translucent dial strip 172 of suitable material. The flanges 170 are provided with depressions to receive projections 174 on the inside of clip members 173 of metal which engage over the flanges. The rims of the flanges 170 fit the cylindrical member 171 closely and the clip members 173 hold the two casing parts 175, 176 firmly together with the member 171 secured rigidly between them. The clip members 173 are sprung into position over the flanges 170 and are readily removed when required for the purpose of obtaining access to the inside of the casing. The dial strip is illuminated by a dial lamp 62 in the housing 63 extending downwardly from the radial arm 64 which is fixed to the column 13 by the screw 66 below the socket member 84.

The wave-change switch 43 is adjusted by the tubular member 41, the arrangement being substantially identical with that shown in Figure 1. The volume control potentiometer, however, is mounted on a bracket 90 fixed to the underside of the platform 70 and its spindle 91 has a forked lever 92 fixed to it similar to the member 45. The member 92 is engaged by a pin 93 extending radially from a collar 94 which is fixed to the upper end of the tubular member 42 by means of a screw 95, so that when the member 42 is turned by means of the sleeve 53, the lever 92 is rocked, thereby turning the spindle 91 of the potentiometer 89.

The column 13 is slidable within the pillar 177 as in the embodiment shown in Figure 1, the receiver casing being shown in Figure 2 in its lowest position with the pin 182 inserted in the holes 179 and 180. In order to raise the casing, it is only necessary to withdraw the pin 182 and move the receiver casing downwardly until the holes 179 register with another pair of holes 181 in the column to enable the casing to be supported in the higher position by the insertion of the pin 182 through the holes 179 and 181.

In the construction shown in Figure 1, the top of the column 13 is unobstructed, so that the aerial lead-in conductor, as well as the leads for connecting the receiver to a power supply system may be passed into the casing through the column and the bottom of the pillar 177. As shown in Figure 2, however, the top of the column 13 is closed by the member 84 which carries the loud speaker movement. The aerial lead-in conductor and leads for the power supply are therefore passed into the casing through holes 183, 184 provided in the column.

In the embodiment shown in Figures 4 and 5, the platform 100 is secured to lugs 72 on the casing part 3 by means of screws 71 screwed into nuts in blocks of insulating material 74 provided inside the platform 100 at the corners, the said blocks 74 having hollow cylindrical extensions 75 surrounding the screws and passing through plates 76 of insulating material between the lugs 72 and the corners of the platform, in the same manner as in the embodiment shown in Figures 2 and 3. The platform 100 in this case, however, is hexagonal.

A central hub 101 welded to the underside of the platform 100 encloses a flanged bearing bush 102 of insulating material which surrounds the column 13, a collar 103 being secured to the column 13 by a screw 203 so as to bear against the flange of the bush 102. A collar 21 is secured to the column 13 below the hub 101 by means of a screw 22 and bears against the lower end of the bush 102 and against a washer 79 of insulating material which surrounds the lower end of the bush so as to insulate the collar 21 from the lower end of the hub 101.

In this embodiment, the tuning means comprise a plurality of pairs of inductances, two of which only are shown in Figure 5. The said inductances 104, 105 and 106, 107 are carried by tubular supports 108 of insulating material, the ends of which are fixed in brackets 110 riveted to frame members 112 fixed to the platform 100, a plate 111 of insulating material being held at its ends between the brackets 110 and the frame 112. Within each frame 112 a plate 113 of insulating material is slidable against the action of a spring 214 which encircles one end 114 of the plate 113, the said end being reduced and passing through a hole in one of the end walls of the frame member 112. A pin 115 is fixed to the other end of the plate 113 and passes through a hole in the other end wall of the frame 112. The pin 115 is provided with a head 116 which projects into the path of a cam 117 integral with the collar 103.

Each plate 111 carries two pairs of contact springs 118, 119 and 120, 121, the springs 119 and 121 bearing against conducting strips 122, 123 fixed on the plate 113. The contact springs 119 and 121 are connected to conductors 124, 125 connected to appropriate points of the high frequency amplifier or frequency changer circuit, i. e. to the respective grids of the valves. In Figure 4, it is assumed that the conductors 124, 125 are connected to the grids of two separate valves (high frequency and detector valves), the said conductors being earthed to the platform through two condensers 126, 127, respectively. One end of each inductance is also earthed to the platform 101 through a conductor 128, the other ends being connected to the contact springs 118 and 120, respectively.

The bottom of the casing part 3 is provided with a cover plate 10 having a hub 12 which is rotatable around the tubular member 42, as in the embodiment shown in Figure 2, so that the casing can turn around the column 13. As the casing is turned, the heads 116 of the respective pins 115 are forced inwardly by the cam 117 against the action of the springs 214, whereby the conducting springs 122, 123 make contact with the contact springs 118, 120, respectively, and connect the pairs of inductances in turn to the bus-bar conductors 124, 125 and to the required points of the valves.

The inductances 104, 105, 106, 107 are provided with adjustable cores to enable them when connected in parallel to the condensers 126, 127 to tune the receiver to the required wave length, the number of turns in the respective inductances being varied as required to cover the desired frequency range.

In the embodiment shown in Figure 6, the receiver is provided with a casing 142, 143 of cylindrical shape, only the upper part 142 of which is rotatable, the said casing being made of a nonconducting material, such as wood or a plastic composition, e. g. a phenolic or other artificial resin. The casing is supported upon a column 140 having a base 141, the said column passing centrally through the bottom of the casing part 143 which is provided with a hub 144 which can be secured to the column 140 by means of a screw 145.

The upper part 142 of the casing is removably attached by means of screws 139 to angle members 138 of insulating material riveted to the periphery of a supporting platform 146. The column 140 passes through a bearing bush 148 of insulating material which is inserted in the hub 147 of the platform 146, a collar 150 fixed to the column 140 bearing against a flange on the upper side of the bush 148. A collar 151 secured to the column 140 below the platform bears against a washer 149 interposed between the said collar and the end of the hub 147.

The spindle 27 of the tuning condenser is in driving connection with the column 140 through the intermediary of a pulley 152 which is operatively connected by means of a cord 154 to a pulley 153 fixed to the column, so that when the upper casing part 142 is turned around the column the condenser revolves around the column 140, together with the platform 146, thereby turning the spindle of the condenser.

A series of windows 155 provided in the lower part 143 of the casing are illuminated one at a time by means of dial lamp 156 housed in a shielding casing 157 on a bracket 158 fixed to the underside of the platform 146. The windows 155 may be provided with a dial strip or other station indicating means, such as separate cover plates of translucent material bearing the names of the various transmission stations corresponding to the respective tuning adjustment of the receiver.

The receiver shown in Figure 7 is provided with a casing 175, 176 which is mounted on a pillar 177 fixed to a table so as to extend upwardly therefrom. The table is provided with a plurality of superposed leaves 185, 187, the pillar 177 extending at least through the top leaf 185 and being fixed to both leaves. In the case of a table having more than two superposed leaves, the pillar would preferably extend through all the leaves. In order to prevent relative movement between the pillar and the leaves 185, 187, the latter are both fixed to the pillar. It is desirable in order to avoid noises due to relative motion between the pillar and the leaves through which it extends to fix it to the said leaves. For this purpose, as shown in Figure 7, the pillar 177 is provided with flanges 186 and 188 which are secured to the leaves 185, 187 respectively.

The receiver casing is carried by a column 13 which is slidable within the pillar 177, and is secured to the pillar in different positions thereon to enable the receiver casing to be adjusted in height by means of a pin 182 in a similar manner to that shown in Figures 1 and 2.

The receiver casing 175, 176 is rotatable around the column 13 and is operatively connected to the tuning control means of the receiver so as to enable the receiver to be tuned by turning the casing, the said tuning control means together with the other parts of the receiving apparatus being mounted on a platform which may be fixed to the receiver casing and rotate therewith or may be fixed to the column inside the casing which is then rotatable with respect to the platform. Should it not be desired to provide for adjustment of the casing in height, the receiver casing may be rotatable around the pillar 177 itself and the platform, when not attached to the casing, may be attached to the pillar.

The column 13 carries manual actuating members 53, 55 which are connected to adjusting members extending along the inside or outside of the column into the casing, the said adjusting members serving for operating subsidiary control devices, such as a wave-change switch or a volume control member. The adjusting members extending outside the column may be in the form of concentric tubes, as shown in Figures 1 and 2, and may be connected up to the subsidiary control devices in the same manner as the tubes 41 and 42. Such an arrangement is more particularly adapted for use when the platform is secured to the casing. When the platform is fixed to the column 13, the adjusting members are preferably arranged inside the column and connected to the manual actuating members 53, 55 by connecting members passing through the column. In this case, the top of the column 13 must be unobstructed. One of the adjusting members can then be in the form of a central spindle or shaft and directly connected to the adjusting spindle of one of the subsidiary control devices. When the casing of the receiver is rotatable directly around the pillar 177, the adjusting members for the subsidiary control devices are operated by actuating members provided on the pillar.

The adjusting members for the subsidiary control devices may be rotatable or slidable, in which latter case they would operate the spindles of rotary control devices through a rack and pinion mechanism or other driving connection for translating reciprocating motion into rotary motion.

The manner in which the subsidiary controls are operated in the case of this receiver is illustrated as applied for instance to a volume control potentiometer 159 which is carried by a bracket 160 mounted on the upper end of the tuning condenser. The spindle 161 of the potentiometer 159 is provided with flats which are adapted to fit into a rectangular-section axial hole in an adjusting knob 162 which is rotatably mounted in a flanged recessed cover plate 163 removably attached by screws 164 to the casing part 142. By means of this arrangement, when it is desired to remove the casing part 142 from the platform 146, the adjusting knob 162 can be disengaged from the spindle 161 and withdrawn from the said casing part, together with the flanged plate 163.

In certain cases, the stops provided on the casing and the column for limiting the rotary motion of the casing may be so arranged as to prevent the casing from being turned in either direction to prevent the arm carrying the dial lamp from fouling any component on the platform. Such an arrangement may be employed where one or two extra high components arranged close to one another would be liable to strike the arm carrying the dial lamp. If necessary, however, the arm carrying the dial lamp may be provided with a downwardly extending offset portion on the lower end of which the dial lamp is mounted.

In the embodiment shown in Figure 1, the tuning condenser comprises a plurality of sections but it is to be understood that separate condensers may be provided in some cases if more convenient.

The inductances 104, 105, 106, 107 of the receiver shown in Figures 4 and 5 may be arranged in superposed banks or rows, the switching means for each row of inductances being operated by a separate cam fixed to the column and staggered angularly with respect to the cam or cams for operating the switching means of the other rows, so that the inductances in adjacent rows are successively connected in circuit with the fixed condensers 126, 127. Such an arrangement enables a larger number of inductances to be provided than when the inductances are arranged in a single row. If desired, the inductances shown may be replaced by preset adjustable condensers, the condensers, 126, 127 being replaced by tuning coils.

In the embodiment shown in Figure 6, instead of the windows 155 provided in the lower fixed casing part 143, a circumferential series of windows may be provided in the upper rotatable part 142 of the casing, the said windows being provided with a dial strip and co-operating with a dial lamp provided on an arm fixed to the column 140, in the same manner as in the other embodiments shown.

Instead of providing the adjusting means for the subsidiary control devices shown in Figures 1 and 2, the said devices may be operated by means of knobs or the like, in the manner shown in Figure 6.

I claim:

1. A wireless receiver, comprising in combination, a fixed column, a supporting platform arranged for rotation around said column and carrying the receiving apparatus including adjustable tuning means, a casing arranged to enclose said platform and the receiving apparatus thereon with at least a part of the casing rigidly connected to the supporting platform so as to be rotatable therewith, and driving means connected to said tuning means and column and arranged to adjust the tuning means on the platform being turned around the column and thereby revolving the tuning means bodily around the column.

2. A wireless receiver, comprising in combination, a fixed column, a straight-sided supporting platform having at least four sides arranged for rotation around said column and carrying the receiving apparatus, including adjustable tuning means, a casing arranged to enclose said platform and receiving apparatus with at least a part of the casing rigidly connected to the supporting platform at the corners thereof so as to be rotatable with the platform, and driving means connected to said tuning means and column and arranged to adjust the tuning means on the platform being turned around the column and thereby revolving the tuning means bodily around the column.

3. A wireless receiver, comprising in combination, a fixed column, a supporting platform carrying the receiving apparatus, including adjustable tuning means, and arranged for rotation around said column with bearing means of insulating material interposed between the column and the platform, a casing arranged to enclose said platform and receiving apparatus with at least a part of the casing rigidly connected to the supporting platform so as to be rotatable therewith, and driving means connected to said tuning means and column and arranged to adjust the tuning means on the platform being turned around the column and thereby revolving the tuning means bodily around the column.

4. A wireless receiver, comprising in combination, a fixed column, a supporting platform carrying the receiving apparatus, including adjustable tuning means and arranged for rotation around said column, a casing arranged to enclose said platform and receiving apparatus, securing means connected to said platform and at least a part of the casing for rigidly connecting the casing to the supporting platform so as to be rotatable therewith, insulating material interposed between the casing and the platform at the points of connection thereof by said securing means, and driving means connected to said tuning means and column and arranged to adjust the tuning means on the platform being turned around the column and thereby revolving the tuning means bodily around the column.

5. A wireless receiver as set forth in claim 1, in which the tuning means comprise at least one variable condenser arranged with its spindle parallel to the column and the driving means comprise pulleys fixed to the column and the said spindle, respectively, and a cord passed around said pulleys.

MECHAL RABINOWICZ.

REFERENCES CITED

The following references are of record in the file of this patent:

UNITED STATES PATENTS

| Number | Name | Date |
|---|---|---|
| 795,082 | Warner | July 18, 1905 |
| 1,443,803 | Reatherford | Jan. 30, 1923 |
| 1,716,538 | Blackmore | June 11, 1929 |
| 1,890,408 | Ringel | Dec. 6, 1932 |
| 2,240,328 | Crowley | Apr. 29, 1941 |
| 2,288,539 | Morrison | June 30, 1942 |

FOREIGN PATENTS

| Number | Country | Date |
|---|---|---|
| 322,860 | Italy | Nov. 1934 |
| 821,802 | France | Dec. 14, 1937 |